United States Patent Office 3,427,253
Patented Feb. 11, 1969

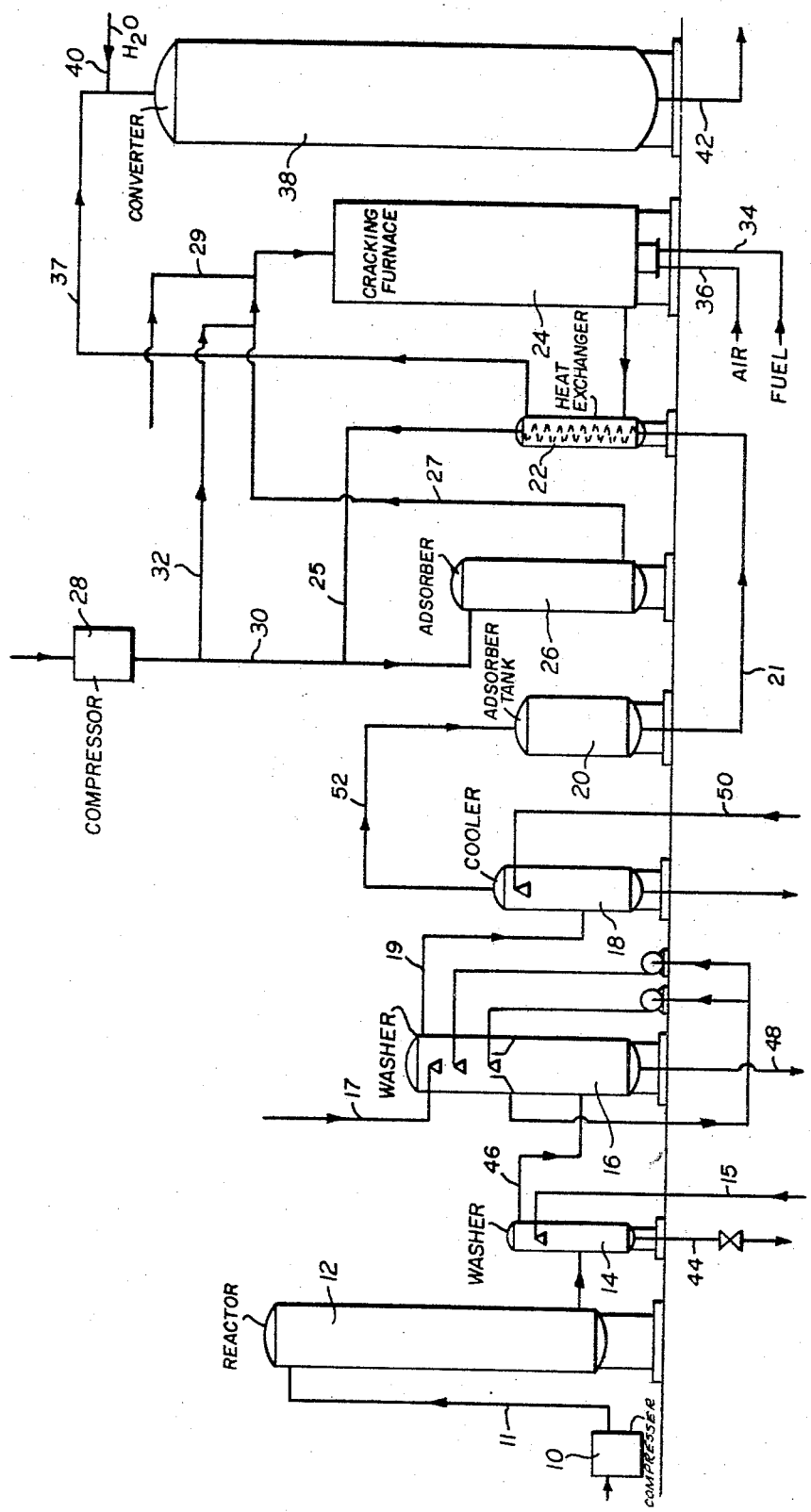

3,427,253
METHOD FOR PRODUCING CARBON MONOXIDE AND HYDROGEN FROM COAL DISTILLATION GAS
Erich Heinz Becker-Boost, Saarbrucken, Otto Gross, Wanne-Eickel, and Walter Heinrich Bill, Heinitz, Saar, Germany, assignors to Otto Construction Corporation, New York, N.Y., a corporation of New York
Filed July 31, 1963, Ser. No. 300,123
Claims priority, application Germany, Aug. 1, 1962, O 8,896
U.S. Cl. 252—373  4 Claims
Int. Cl. C10j *3/00;* C10b *53/04*

The present invention refers to a process for the production of synthesis gases by the catalytic cracking of coal distillation gases.

Heretofore it has been known to convert distillation gases, particularly coke oven gas or gases of similar composition, into synthesis gases by fractional liquefaction and distillation, with the simultaneous application of air if necessary. Recently attempts have been made to avoid the use of the expensive gas and air liquefying equipment which is ordinarily required in connection with the manufacture of synthesis gases for the production of ammonia, methanol or products obtained by Fischer-Tropsch syntheses.

In order to avoid a high nitrogen content in the synthesis gases, the conversion of hydrocarbons to hydrogen and carbon monoxide is carried out by means of steam in an endothermic reaction. This convention reaction is generally carried out in tube furnaces, the tubes of which are usually filled with nickel-containing catalysts and heated from the outside. The life of the catalyst and the reaction velocities at the temperatures employed, e.g. between 650 and 950° C., are satisfactory from an economic and technical standpoint if, and only if, sulphur compounds originally present in the coal distillation gases are extensively removed prior to the conversion reaction.

It is relatively easy to remove sulphur compounds from natural gases and gases obtained in the processing of petroleum. However, when dealing with coal distillation gases and when the use of air and gas liquefying equipment is to be avoided, the problem is more difficult. This is due to the fact that the coal distillation gases contain not only relatively reactive sulfur compounds such as carbon oxysulphide, carbon disulphide and mercaptans, but also relative slow reacting sulfur compounds such as thiophene, cyclic sulphur compounds, and the like.

A means of removing organic sulphur compounds utilizing a two-stage process is already known. In the first stage, gum-forming substances and relatively slow reacting, high-boiling sulphur compounds are adsorbed by activated carbon at low temperature, while in the second stage the remaining sulphur compounds are catalytically converted by means of activated carbon at elevated temperature in the presence of alkalis and with the application of steam and oxygen. Processes of this type are disadvantageous in that the second stage ordinarily cannot be carried out at high pressures, or if so, only under extremely unfavorable conditions. Thus, such processes utilize the activity of the surface area of the activated carbon for the catalytic conversion of the sulphur compounds. At high pressures, the surface area is covered with carbon dioxide, hydrocarbons, and/or other easily adsorbable substances contained in the gas, and as a result the carbon becomes inactivated and inffective. Todal, however, gases are nearly always compressed for further treatment and, as it is advisable to compress gases in the cold state, the energy expended for heating and saturating the gases with water vapor must be dissipated.

It has now been found that it is possible to remove organic sulphur compounds from coal distillation gases at high pressures. This offers a number of advantages with regard to heat economy and operation.

It is a feature of this invention that, in a process for the manufacture of synthesis gases by the catalytic cracking of coal distillation gases from which tar, ammonia, benzol and hydrogen sulphide have been removed by conventional means, first the easily adsorbable organic sulphur compounds are adsorbed by activated carbon in a known manner, and then the remaining sulphur compounds are absorbed by substances containing lime or zinc oxide in the present of oxygen at a temperature in excess of 300° C. and preferably between about 350 and 500° C. The purified gases are then catalytically cracked to carbon monoxide and hydrogen, desirably utilizing heated tube furnaces in the presence of steam and, where required, carbon dioxide or air, at a temperature in excess of 650° C. and preferably between about 750 and 950° C. Where necessary, the carbon monoxide is converted with steam in a further stage.

The accompanying figure diagrammatically illustrates one process of this invention.

It has been known heretofore to use substances containing zinc oxide or lime to effect the removal of sulphur from industrial gases. However, when dealing with coal distillation gases, this resulted in a final sulphur content of 10 mg./Nm.$^3$ (milligrams per normal cubic meter) and higher, so that favorable reaction temperatures and velocities in the tubular cracking furnace could not be achieved owing to a decrease of the activity of the catalyst by poisoning. It was found that with an initial sulphur content of 150 mg./Nm.$^3$, the absorbing medium was completely saturated after a short time in operation, and it had to be regenerated. If, according to the present invention, prior to the cracking operation, the easily adsorbable, slowly reacting sulphur compounds are completely removed and the other sulphur compounds are partially removed by means of activated carbon, e.g., to a residual sulphur content of 15 mg./Nm.$^3$, then the time to reach the same degree of saturation in the absorbing medium (lime or zinc oxide) is extended ten fold. Moreover, a higher degree of saturation can be obtained and tolerated, because only the more reactive sulphur compounds are present, which compounds because of their relatively high reactivity, permit the absorbing media to be more strongly enriched with sulphur. It thus becomes possible to prolong the operating time for each absorber filling for one year and longer without taking any special precautions.

The process of this invention offers the advantage that it can be carried out under elevated pressures, both with respect to the adsorption by activated carbon (which is favorably influenced by the application of pressure), and with respect to the subsequent complete removal of the organic sulphur compounds. It thus becomes possible to carry out the preceding gas treatment, e.g., the removal of benzol, hydrogen sulphide and/or nitric oxides, under pressure in conventional manner and to utilize the heat of compression for the removal of nitric oxides and/or hydrogen sulphide. For instance, the gases heated by compression are permitted to react for about 0.5 to 2 minutes at about 90–120° C., whereby the nitric oxides which are the cause of gum formation are extensively converted to gums. The nitric oxides are thus converted into gums at a point where they cannot disturb the process. This is advantageous in connection with the present invention in that after the foregoing heat treatment (at about 90–120° C.), the gases can be extensively freed of formed gums and hydrocyanic acid. This removal of gums and hydrocyanic acid is effected, according to another aspect of this invention, by cooling the gases and washing with water or oil, to thereby remove these troublesome substances. The usually high consumption of activated carbon in effecting removal of the slowly reacting organic sulphur compounds is thereby markedly reduced, because the activated carbon does not become loaded with gums.

The process of the present invention enables the sulphur content to be reduced to about 1 mg./Nm.$^3$ or less. The cracking of the hydrocarons, e.g. via nickel catalysts with oxygen or oxygen-containing compounds such as air, water vapor or carbon dioxide, or mixtures thereof can thus be performed much more easily. When calculating the equilibrium constant based on the composition of the cracked gases, this correcsponds to a temperature which is only about 20 to 50° C. below the temperature of the catalyst. This results in a temperature of about 750 to 900° C. or even 950° C. in the tubular cracking furnace. Using presently available alloys, such high temperatures can be applied without any difficulty, even under elevated pressures, so that the process can be carried out in an endothermic manner.

The process enables the final hydrocarbon content in the cracked gas produced to be decreased to less than 1% methane, e.g. to from about 0.1 to 0.2%. The gas is then additionally treated depending on the particular purpose for which it is to be used. Thus, for ammonia synthesis it is converted with steam and then freed of carbon dioxide and carbon monoxide in conventional manner. For methanol synthesis or similar reactions, cracked gas poor in nitrogen can be used directly after carbon dioxide washing, if necessary.

The process of this invention offers certain advantages with respect to heat economy. Thus, gases can be heated by indirect heat exchange to the temperature required in the second purification stage wherein a material containing lime or zinc oxide is employed. This is effected according to another feature of the invention, by disposing a heat exchanger before the second purification stage. Through this heat exchanger are passed the cracked gases having a temperature between 650 and 950° C., and also there are passed through the heat exchanger those gases leaving the adsorption stage. The latter gases thus are heated to temperatures to from about 300 to 550° C. without any additional provision for heat expenditure.

The accompanying figure is a diagram of one process of this invention. The diagram is more fully explained hereinafter, by reference to the specific example.

Example

Referring to the figure, coal distillation gas freed from benzol, ammonia and tar, and being kept at normal pressure and at normal temperature, is compressed in compressor 10, wherein its temperature is raised to about 100° C. due to the heat of compression. The gas is then passed via line 11 to tank 12 and is permitted to react for some time in tank 12 whereby the bulk of the nitric oxide present is converted to nitrogen dioxide, which rapidly reacts with unsaturated hydrocarbons to form gums. The gas (containing gums therein) is passed via line 13 to tank 14 and the gums are removed in tank 14 by washing with oil or water. The wash oil or water enters tank 14 via line 15. The gums are removed via line 44. The washing serves to cool the gas to a temperature of about 45° C., which is required for subsequent removal of hydrogen sulphide. The gum-free gas is then passed via line 46 to washer 16. Hydrogen sulphide is virtually completely removed in washer 16 by washing with an alkaline arsenite solution, which enters washer 16 via line 17. The sulphur containing arsenite solution exits via line 48. It is separately processed and can be recovered if desired. The gas, which is at a temperature of about 45° C., is passed to tank 18 via line 19 and is cooled down to a normal temperature of about 15° C. by means of cold water introduced into tank 18 via line 50. This also permits one to remove any hydrocyanic acid still contained in the gas by simply using additional wash water. The gas is then passed via line 52 to tank 20. Tank 20 is charged with activated carbon, and as the gas is passed therethrough the bulk of the higher boiling, more slowly reacting and easily adsorbable sulphur compounds are removed. The gases are then conducted via line 21 to heat exchanger 22 and are heated, by hot reaction gases which enter heat exchanger 22 via line 23 from the cracking furnace 24, to temperatures of about 420 to 520° C. The gas is then passed via line 25 to tank 26, which contains zinc oxide or lime. If a zinc oxide contact is used instead of the lime contact in tank 26, heating up to about 300 to 350° C., is sufficient. In tank 26, the quickly reacting sulphur compounds, which are however difficult to adsorb, combine with free oxygen and are absorbed so that they exert no disturbing effect on the subsequent cracking of the hydrocarbons.

In the present example it has been assumed that coal distillation gas is processed to an ammonia synthesis gas. There must be a fixed ratio of hydrogen and nitrogen in the ammonia synthesis gas. Accordingly, the air used for combustion in the cracking furnace 24 and to supply the required nitrogen must have a fixed volume. This volume of air is supplied by compressor 28 at reaction pressure. A small portion of this air is added to the process gas through line 30 before the gas enters tank 26. The greater portion of air is added, however, to the gas (which exits from tank 26 via line 27) through line 32 before cracking furnace 24, steam being added via line 29 to the gas at the same time. The cracking furnace 24 consists of tubes filled with catalyst, heat being supplied externally. This heat is produced by burning fuel fed through line 34, e.g., gas, benzine or oil, with the combustion air admitted through line 36. It is advisable to preheat the fuel and the air.

By a modification of the foregoing, the process for cracking the hydrocarbons into hydrogen and carbon monoxide can also be carried out in two stages. In this instance, the gas is converted in the first stage in externally heated tubes filled with catalyst by means of steam without air or with only a very small quantity of air, while the greater part of the air is added in the second stage, the methane being cracked by exothermic reaction. The formed carbon monoxide is passed via line 37 to converter 38 and is converted by means of steam, further water being added through line 40 if necessary. Depending upon the particular operating conditions employed the water may be in the form of steam or in the liquid state. The converted gas leaves the converter through line 42 and can then be further treated in conventional manner to remove carbon dioxide atnd carbon monoxide.

Variations can of course be made without departing from the spirit of our invention.

Having thus described our invention, what we desire to secure and claim by Letters Patent is:

1. In a method of producing carbon monoxide and hydrogen from coal distillation gas containing nitric oxide and unsaturated carbons, said distillation gas having previously been freed of any benzol, ammonia, and tar therein, this method comprising catalytically cracking said gas to carbon monoxide and hydrogen, the improvement comprising, prior to said catalytic cracking, compressing said gas and raising the temperature thereof to from about 90 to 120° C., passing the heated gas into a chamber and permitting the preponderance of the nitric oxide present to be converted to nitrogen dioxide followed by reaction of said nitrogen dioxide with the unsaturated hydrocarbons to form gums, removing said gums by washing with oil or water adapted to cool said gas to a temperature of about 45° C. to permit removal of hydrogen sulfide therefrom, removing said hydrogen sulfide by washing with an alkaline arsenite solution, cooling said gas by cold water and thereby removing any HCN present therein, contacting the resultant gases with activated carbon to adsorb and remove from said gases easily adsorbable sulfur compounds, and thereafter contacting said gases in the presence of oxygen with an adsorbent consisting of a material selected from the group consisting of lime and zinc oxide at a temperature in excess of about 300° C. to adsorb sulfur compounds still contained in said gases, the temperature being at least about 420° C. when said adsorbent is lime.

2. The method of claim 1 wherein said temperature for contacting said gases with said absorbent is from about 350 to 500° C., and wherein said catalytic cracking is carried out in the presence of carbon dioxide, air, or mixtures thereof at a temperature of from about 750 to 950° C.

3. The method of claim 1 wherein said distillation gases, prior to contacting said absorbent, are subjected to indirect heat exchange with hot gases obtained from said catalytic cracking step.

4. The method of claim 1 wherein oxygen necessary for the absorption by lime or zinc oxide of said sulphur compounds still contained in said gases is supplied by branching off a portion of the air required for said cracking and supplying said air to said gases prior to the contacting thereof with said absorbent.

References Cited

UNITED STATES PATENTS

| | | | |
|---|---|---|---|
| 1,439,920 | 10/1922 | Mittasch et al. | 23 |
| 1,904,441 | 4/1933 | Freyermuth et al. | 23—212 |
| 2,934,407 | 4/1960 | Simonek et al. | 23—213 |
| 3,031,258 | 4/1962 | Giammarco | 23—2 |
| 3,069,249 | 12/1962 | Herbert et al. | 23—213 X |
| 3,074,783 | 1/1963 | Paull | 23—213 X |
| 3,115,394 | 12/1963 | Gorin et al. | 23—213 X |
| 3,000,988 | 9/1961 | Karchmer et al. | 23—3.1 XR |

FOREIGN PATENTS

| | | |
|---|---|---|
| 228,959 | 2/1925 | Great Britain. |
| 254,288 | 1/1927 | Great Britain. |
| 345,067 | 3/1931 | Great Britain. |
| 613,651 | 12/1948 | Great Britain. |
| 870,714 | 6/1961 | Great Britain. |

OSCAR R. VERTIZ, *Primary Examiner.*

BENNETT H. LEVENSON, *Assistant Examiner.*

U.S. Cl. X.R.

23—213, 3; 252—374

PO-1050
(5/69)

UNITED STATES PATENT OFFICE
CERTIFICATE OF CORRECTION

Patent No. 3,427,253    Dated February 11, 1969

Inventor(s) E. H. BECKER-BOOST ET AL

It is certified that error appears in the above-identified patent and that said Letters Patent are hereby corrected as shown below:

Column 1, line 67, "Todal," should read -- Today,--.
Column 4, line 51, "atnd" should read -- and --; line 58, the word "carbons," should read -- hydrocarbons, --.

SIGNED AND
SEALED
FEB 3 1970

(SEAL)
Attest:

Edward M. Fletcher, Jr.                    WILLIAM E. SCHUYLER, JR.
Attesting Officer                          Commissioner of Patents